(12) United States Patent
Scope et al.

(10) Patent No.: US 10,300,419 B2
(45) Date of Patent: May 28, 2019

(54) FILTER MEDIUM, FILTER ELEMENT AND FILTER ARRANGEMENT

(71) Applicant: MANN+HUMMEL GMBH, Ludwigsburg (DE)

(72) Inventors: Andreas Scope, Oberschoena (DE); Alexander Piry, Schwaebisch-Gmuend (DE); David Keerl, Bayreuth (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 179 days.

(21) Appl. No.: 15/186,452

(22) Filed: Jun. 18, 2016

(65) Prior Publication Data

US 2016/0296871 A1  Oct. 13, 2016

Related U.S. Application Data

(63) Continuation of application No. PCT/EP2014/078501, filed on Dec. 18, 2014.

(30) Foreign Application Priority Data

Dec. 18, 2013  (DE) ........................ 10 2013 021 071

(51) Int. Cl.
| | |
|---|---|
| *B01D 53/02* | (2006.01) |
| *B01D 46/00* | (2006.01) |
| *B01D 39/16* | (2006.01) |
| *B01D 39/08* | (2006.01) |
| *B60H 3/06* | (2006.01) |

(52) U.S. Cl.
CPC ......... *B01D 46/0028* (2013.01); *B01D 39/08* (2013.01); *B01D 39/1623* (2013.01); *B01D 46/0036* (2013.01); *B60H 3/0658* (2013.01); *B01D 2239/0407* (2013.01); *B01D 2239/0442* (2013.01); *B01D 2239/065* (2013.01); *B01D 2239/0645* (2013.01); *B01D 2239/10* (2013.01); *B01D 2275/10* (2013.01); *B01D 2279/40* (2013.01); *B01D 2279/65* (2013.01); *B60H 2003/0691* (2013.01)

(58) Field of Classification Search
CPC .... B01D 46/028; B01D 46/036; B01D 39/08; B01D 39/1623
See application file for complete search history.

(56) References Cited

U.S. PATENT DOCUMENTS

| | | | |
|---|---|---|---|
| 5,888,527 A | 3/1999 | Nashimoto et al. | |
| 6,669,761 B2 | 12/2003 | Schultheiss et al. | |
| 2006/0278086 A1* | 12/2006 | Inagaki | B01D 46/0001 96/223 |

(Continued)

FOREIGN PATENT DOCUMENTS

| | | |
|---|---|---|
| CN | 1805776 A | 7/2006 |
| DE | 202007010383 U1 | 10/2007 |
| DE | 102012005380 A1 | 9/2013 |

(Continued)

*Primary Examiner* — Christopher P Jones
(74) *Attorney, Agent, or Firm* — James Hasselbeck

(57) ABSTRACT

A filter medium is provided with a first filter layer that retains particles and a second filter layer provided with an antimicrobial material and an anti-allergenic material. The anti-allergenic material contains polyphenols. The filter medium is designed particularly for filtering air for the passenger compartment of motor vehicles.

23 Claims, 3 Drawing Sheets

(56) References Cited

U.S. PATENT DOCUMENTS

2008/0250934 A1    10/2008    Inagaki et al.

FOREIGN PATENT DOCUMENTS

| EP | 1882511 | A2 | 1/2008 |
| EP | 1946815 | A1 | 7/2008 |
| EP | 1985350 | A2 | 10/2008 |
| WO | 2012168185 | A1 | 12/2012 |
| WO | 2014019660 | A1 | 2/2014 |

* cited by examiner

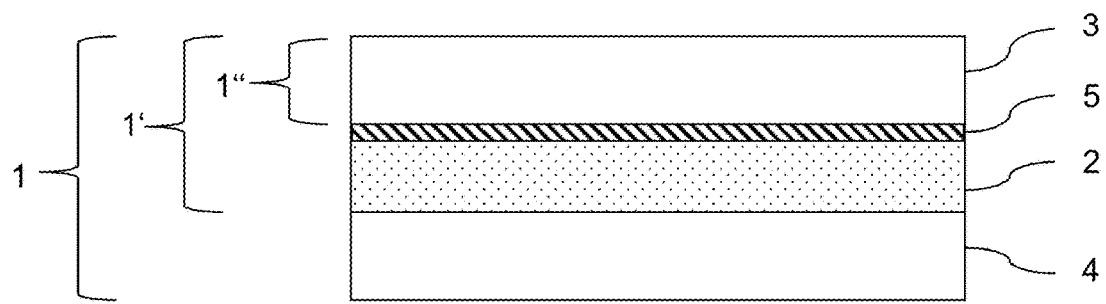
Figur 1
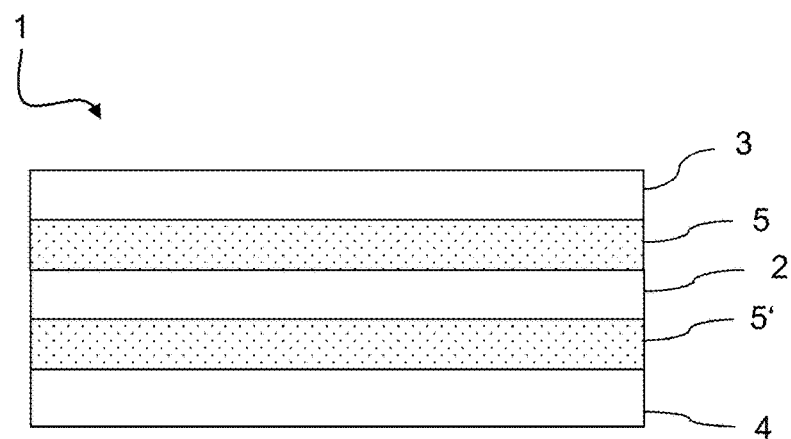
Figur 2A

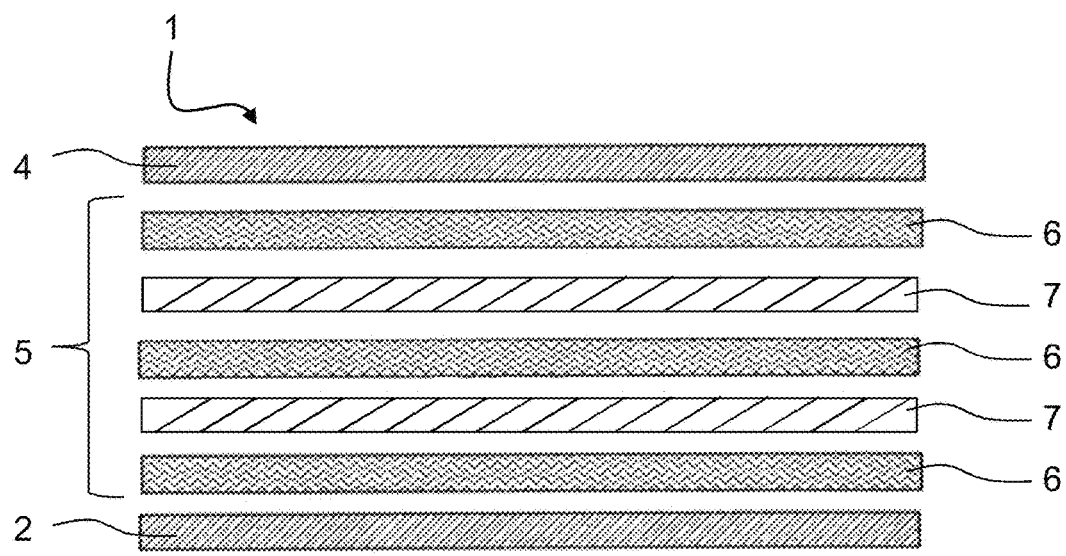
Figur 2B
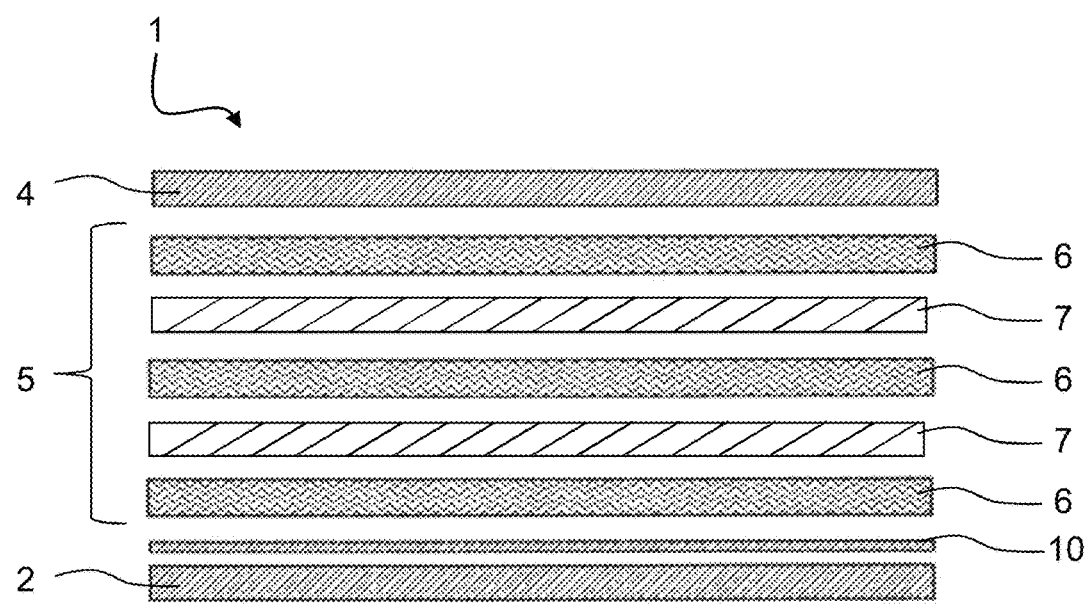
Figur 2C

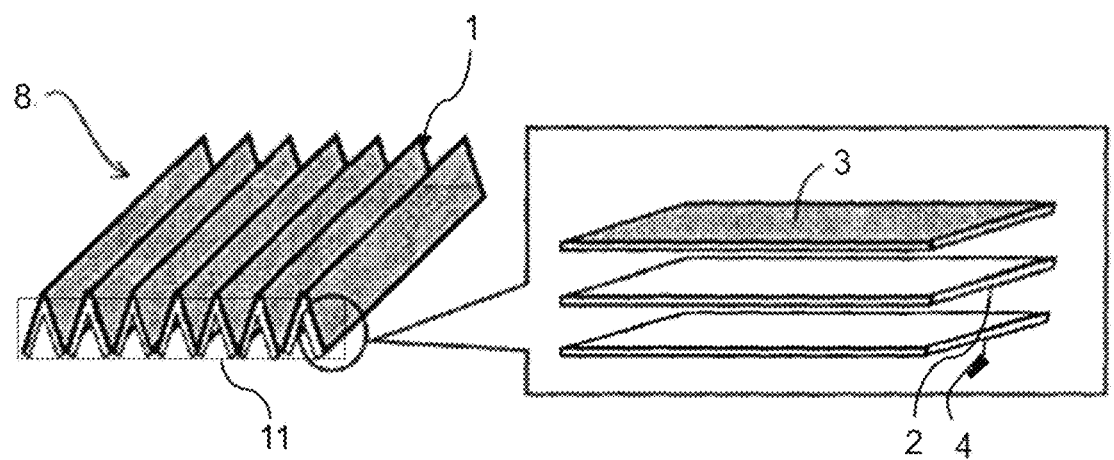
Figur 3
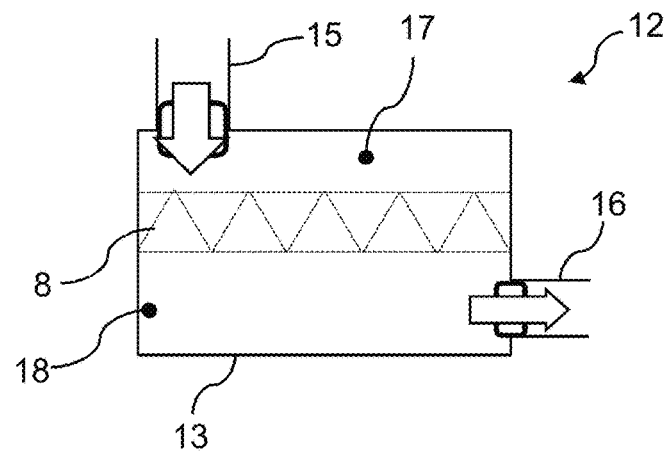
Figur 4

FILTER MEDIUM, FILTER ELEMENT AND FILTER ARRANGEMENT

CROSS-REFERENCE TO RELATED APPLICATIONS

This application is a continuation application of international application No. PCT/EP2014/078501 having an international filing date of 18 Dec. 2014 and designating the United States, the International Application claiming a priority date of 18 Dec. 2013, based on prior filed German patent application No. 10 2013 021 071.2, the entire contents of the aforesaid international application and the aforesaid German patent application being incorporated herein by reference.

BACKGROUND OF THE INVENTION

The present invention concerns a filter medium, a filter element, and a filter arrangement, in particular a passenger compartment air filter and a passenger compartment air filter arrangement for purifying air entering the passenger compartment of a motor vehicle.

Filter elements made from filter media serve for filtration of in particular gaseous media, for example, filtration of an air flow that is supplied to the passenger compartment of a motor vehicle. Even though applicable to any type of filter element, the present invention and the problems to be solved will be explained in the following with respect to a filter medium or filter element for filtration of air for the passenger compartment of a motor vehicle. Such filters are referred to in the following for short as vehicle interior filters.

Due to the increasing air pollution, in particular in metropolitan areas, in connection with the use of air-conditioning devices, it is desirable and also necessary to filter by means of suitable filters the air that is supplied from the exterior into the passenger compartment of a motor vehicle and is processed or air-conditioned. For this purpose, for example, particle filters or odor filters or alternatively also combinations thereof are conceivable which are to filter out the particles contained in the air as well as inherent smells of the ambient air or adsorb the substances contained in the ambient air as much as possible. Such filters for filtration of air for the passenger compartment of a motor vehicle are generally known in a plurality of embodiments and variants so that their configuration and function will be addressed in the following only briefly.

The employed filter media are also intended to remove pollutants, for example, dust and carbon-particulate matter as well as pollen, bacterial and fungal spores, bacteria and fungi. Some metabolic products of the microorganisms are known to constitute allergenic substances for the human body or its immune system. They can trigger allergic reactions, in particular in the area of the mucous membranes, for example, of the respiratory system, of the eyes or nose. Desirable is a filtration as comprehensive as possible of particles and other potentially harmful substances by the filter medium.

EP 1 882 511 A2 discloses, for example, a filter medium with bactericidal action, in particular for filtration of air for the passenger compartment of motor vehicles, comprised of at least one filter layer that filters out impurities and of a bactericidal filter layer downstream of said filter layer which is arranged at the clean side of the at least one filter layer and is spaced apart by a spacer layer from the at least one filter layer.

WO 2012168185 A1 describes a filter medium with antimicrobial action, in particular for filtration of air for the passenger compartment of motor vehicles, comprised of at least one first filter layer that filters out impurities and of a second filter layer neighboring said first filter layer. The second filter layer is attached to the inflow side of the first filter layer and contains antimicrobial materials.

SUMMARY OF THE INVENTION

In view of this background, the present invention has the object to provide an improved filter medium, a filter element and/or an improved filter arrangement.

Accordingly, a filter medium is proposed which comprises a first filter layer for retaining particles as well as an antimicrobial material and an anti-allergenic material. Preferably, a second filter layer of the filter medium comprises the antibacterial material and the anti-allergenic material.

Advantageously, since the second filter layer comprises the antimicrobial material and the anti-allergenic material, the antimicrobial material can prevent metabolization or decomposition of the anti-allergenic material, in particular by fungi. This is particularly relevant for anti-allergenic materials in the form of polyphenols.

The second filter layer can comprise a support material, in particular a fiber material, for example, a nonwoven, laid fabric, woven fabric, felt, spunbonded fabric, or a meltblown material, which comprises the antimicrobial material and the anti-allergenic material or into which the antimicrobial material and the anti-allergenic material are introduced or incorporated (for example, by being sprayed on). The second filter layer can be in particular a single continuous layer of such a fiber material.

The filter medium is in particular configured for filtration of air for the passenger compartment of motor vehicles. Other fields of use are however also conceivable, for example, in air-conditioning devices for buildings.

The antimicrobial, in particular antibacterial or biocidal, material protects the filter medium, or parts or layers thereof, from becoming infested with microorganisms such as fungi or fungal spores, in particular mold or mold spores, bacteria or algae which may be present in living, reproductive or proliferating form, or protects the filter medium from such microorganisms spreading within and from a penetrating growth of such microorganisms through the filter medium.

The anti-allergenic material can at least partially render innocuous for the human body, or its immune system, for example super-fine pollen particles and other allergenic substances that cannot always be retained completely by the filter medium. This leads to increased comfort within the vehicle.

As antimicrobial material, in particular zinc pyrithione can be used. Alternatively or additionally, octylisothiazolinone can be used as an antimicrobial material. The second filter layer moreover may contain antimicrobial materials on the basis of nanosilver. The second filter layer can also contain antimicrobial metals and metal compounds, in particular silver, copper, and aluminum compounds, and/or 2-bromo-2-nitropropane-1,3-diol, further isothiazolinone compounds, benzoic acid and its derivatives, benzalkonium halides, water-soluble coenzymes, oil-soluble coenzymes, plant extracts, antibiotics, biocidal metals, aliphatic and/or aromatic fatty acids and/or quaternary surfactants as antimicrobial materials.

As anti-allergenic materials, in particular polyphenols, such as catechines, tannins or flavonoids, are conceivable. In particular, caffeic acid, gallic acid, ellagic acid, tannic acid, cyanidin, procyanidin, proanthocyanidins, rutin, quercetin, resveratrol can be employed. Moreover, polyphenols, for example, tannin or tannic acid, in particular derived from wood (for example, tree bark), apple extracts or citrus fruit extracts are conceivable. Polyphenols bind preferably allergenic substances so that the allergenic effect can be reduced. Allergens are denatured by polyphenols, for example. The anti-allergenic material can moreover comprise anti-allergenic enzymes. Anti-allergenic enzymes cleave preferably allergenic proteins into smaller unharmful components. Generally speaking, the quantity of the polyphenols in the filter medium can be between 3 and 15 $g/m^2$, preferably between 5 and 10 $g/m^2$ (in particular in the second filter layer).

In particular, the filter medium, preferably in the second filter layer, may contain one or several of the materials listed in the following Tables 1 and 2, even in any combination.

TABLE 1

| Material | Preferred quantity [$g/m^2$] | More preferred quantity [$g/m^2$] |
|---|---|---|
| tannin and/or tannic acid | 1-50 $g/m^2$ | 5-20 $g/m^2$ |
| octylisothiazolinone | 0.5-30 $g/m^2$ | 1-15 $g/m^2$ |
| dye | 0.1-20 $g/m^2$ | 0.3-10 $g/m^2$ |
| surfactant | 0.05-5 $g/m^2$ | 0.1-3 $g/m^2$ |

TABLE 2

| Material | Preferred quantity [wt. %] | More preferred quantity [wt. %] |
|---|---|---|
| tannin and/or tannic acid | 0.05-80% | 1-25% |
| octylisothiazolinone | 0.5-50% | 1-20% |
| dye | 0.1-30% | 0.3-10% |
| surfactant | 0.05-10% | 0.1-3% |

The Tables 1 and 2 differ in their definition of the quantity of the materials introduced into the second filter layer, i.e., on the one hand, according to weight per surface area and, on the other hand, weight percent (in each case referring to the second filter layer).

The filter medium itself can be of a multi-layer configuration. In the flow direction through the filter medium, for example, a particle filter layer, an odor filter layer, comprising active carbon, and/or an anti-allergenic filter layer may follow downstream of the antimicrobial filter layer. Alternatively, an odor filter layer and then a particle filter layer may follow downstream of the antimicrobial layer. In this context, any sequence of the filter layers is conceivable. For example, the following sequence can be provided also: antimicrobial filter layer, anti-allergenic filter layer, odor filter layer, and particle filter layer.

The employed active carbon can be obtained for example from wood or coal, can be polymer-based, tar-based, or based on coconut shells. In one embodiment, as a basic material for active carbon, ion exchanger spheres are employed which are made from polymer, for example, synthetic resins, in particular polystyrene cross-linked with divinyl benzene.

In particular those active carbons that have a comparatively minimal water absorption capacity are understood as being hydrophobic. Preferably, an active carbon is employed which, at a relative humidity of the air of 50%, has a water absorption capacity of <10 percent by mass, in particular relative to the adsorption branch of the isothermal curve. In particular, this water absorption capacity is <5 percent by mass.

In one embodiment, the active carbon has a BET surface area of greater than 600 $m^2/g$, preferably greater than 800 $m^2/g$ (preferably measured according to DIN ISO 9277: 2003-05). In this way, a satisfactory adsorption can be ensured within a small space.

In one embodiment, active carbon is provided in flowable or pourable form, for example, in the form of particles that are granular or spherical or formed in other shapes. The active carbon particles comprise preferably active carbon particle sizes (mean diameter) of between 0.1 and 1 mm, preferably 0.2 to 0.7 mm, and can be present, for example, in the form of granular active carbon or spherical active carbon.

For example, an open pore foam with pourable active carbon can be employed for the adsorption layer. For example, reticulated foams e.g. of plastic materials such as polyurethane, polyurethane ether or polyurethane ester are employed. Preferably, the pore sizes of the foam amount to between 20 and 50 ppi (pores per inch) or between 0.5 and 2 pores per mm. The measurement is carried out by a comparative optical method, wherein under a microscope a completely formed pore is defined as a "standard pore" and, across a foam section, the existing pores are compared with the standard pore and counted. Pores that, compared to the standard pore, are not completely formed are counted only proportionally.

Preferably active carbon particles are introduced into this foam and preferably fixed therein. The active carbon particles in this context are preferably fixed within the foam by means of an adhesive, for example, by means of a two-component adhesive on polyurethane basis. This can be achieved, for example, in that the foam is first impregnated with an adhesive and subsequently, before the adhesive dries or cures, active carbon particles are poured in, in particular with shaking action. In this context, a two-component adhesive, a hot melt adhesive or an aqueous adhesive can be employed.

In one embodiment, a layer of a fixed fill of active carbon is used as an adsorption filter layer. The fill can be realized as a single-layer or multi-layer construction. A fixed fill is to be understood as an arrangement in which a support layer is provided and a bulk layer of active carbon particles is fixed thereon. For example, a plastic mesh or a layer of flat material, for example, of a particle filter medium, can be employed as support layer. In a preferred embodiment, the support layer is a nonwoven of spunbonded or meltblown polyester fibers, for example, PET fibers (polyethylene terephthalate) or PBT fibers (polybutylene terephthalate) are used. The nonwoven can have a weight per surface area of 25 $g/m^2$-120 $g/m^2$, preferably 50 $g/m^2$-100 $g/m^2$, particularly preferred 60 $g/m^2$-90 $g/m^2$, and an air permeability of >3,000 $l/m^2s$, preferably >4,000 $l/m^2s$, at a pressure difference of 200 Pa. The air permeability is measured in particular in accordance with ISO 9347. The bulk layer of active carbon particles is applied onto the support layer and preferably fixed by means of a fine adhesive layer on the support layer. This is realized, for example, in the form of a plurality of dots of adhesive applied onto the support layer or by means of a net of adhesive strings applied between support layer and bulk layer and/or applied into the bulk layer during pouring and/or applied onto the bulk layer.

The bulk layer comprises preferably a quantity of 100 $g/m^2$-1,200 $g/m^2$ of active carbon particles on the support layer. Preferably, between 200 $g/m^2$ and 600 $g/m^2$ are used.

The layer of a fixed fill with support layer and bulk layer has preferably an air permeability in the range of 800 l/m²s-1,300 l/m²s, in particular between 900 l/m²s and 1,200 l/m²s, and a weight per surface area in the range of 350 g/m² to 950 g/m², in particular between 450 g/m² and 750 g/m², at a layer thickness in particular in the range of 1 mm to 6 mm.

In this way, a stable, efficient layer of a fixed fill that can be processed easily can be provided which can be combined by automated processing to a multi-layer semi-finished product.

In one embodiment, the adsorption filter layer or the adsorption construction comprises a layered construction of several fixed fills. For example, a first layer of a fixed fill can be placed with the side on which the active carbon is arranged (active carbon side) onto the active carbon side of a second layer of a fixed fill and can be connected therewith adhesively, for example. In this way, a semi-finished product with two support or cover layers and interposed bulk layer can be formed. A multitude of such semi-finished products can also be stacked on each other for increasing the filtration performance, for example, between two and 10 semi-finished products, preferably between 3 and 7 semi-finished products. Alternatively or in combination, arrangements are also conceivable in which the support layer of a layer of a fixed fill is placed onto the active carbon layer of another fixed fill. This arrangement can then be completed by a turned-over layer with fixed fill or a cover layer. For example, between 4 and 20 layers of a fixed fill can be arranged on top of each other.

According to a further embodiment, the filter medium comprises a second filter layer which contains the antimicrobial material and a third filter layer which contains the anti-allergenic material.

According to a further embodiment, the first filter layer is arranged between the second filter layer and the third filter layer.

According to a further embodiment, the second filter layer and/or the third filter layer are immediately neighboring the first filter layer.

According to a further embodiment, the first filter layer comprises the antimicrobial material and the anti-allergenic material; the first filter layer comprises the antimicrobial material and a second filter layer the anti-allergenic material; or the first filter layer comprises the anti-allergenic material and a second filter layer the antimicrobial material.

According to a further embodiment, the first filter layer, second filter layer, third filter layer and/or a further filter layer is embodied as a fine filter, in particular for filtering particles with a diameter of 10 μm and greater, preferably 2.5 μm and greater.

Such a filter medium is particularly suitable as a motor vehicle passenger compartment filter. In this context, the filter medium is preferably folded or corrugated for increasing the surface area. In various configurations, the folded or corrugated filter medium can be provided at least on one side with a side strip of nonwoven or can be embedded in a plastic frame. The folded or corrugated filter medium can be provided with a side strip, in particular a side strip of nonwoven, on at least one of its end face edges; these are the sides or end faces of the folded or corrugated filter medium that exhibit a zigzag or corrugated shape.

A motor vehicle passenger compartment filter with the afore described filter medium can be used as an exchangeable filter element in a filter module, in particular the filter module of a motor vehicle air-conditioning device, comprising a filter receptacle or a filter housing.

Further possible implementations of the invention comprise also combinations, not explicitly mentioned, of features or method steps disclosed above or in the following in regard to the embodiments. In this context, a person of skill in the art will also add individual aspects as improvements or supplements to the respective basic form of the filter medium, of the filter element, or of the filter arrangement.

Further configurations of the invention are subject matter of the dependent claims as well as of the embodiments of the invention described in the following. In the following, the invention will be explained in more detail with the aid of embodiments with reference to the attached figures.

BRIEF DESCRIPTION OF THE DRAWINGS

FIG. 1 shows a schematic illustration of an embodiment of a filter medium.

FIG. 2A shows a schematic illustration of an embodiment of a filter medium provided with an adsorption material.

FIG. 2B shows a schematic illustration of another embodiment of a filter medium provided with an adsorption material.

FIG. 2C shows a schematic illustration of yet another embodiment of a filter medium provided with an adsorption material.

FIG. 3 is a schematic illustration of an embodiment of a filter element.

FIG. 4 is a schematic illustration of an embodiment of a filter arrangement.

In the Figures, same or functionally the same elements, inasmuch as nothing to the contrary is indicated, are provided with the same reference characters.

DESCRIPTION OF PREFERRED EMBODIMENTS

FIG. 1 shows a possible construction of a filter medium 1 with a first filter layer 2 for particle filtration, a second filter layer 3 with an antimicrobial material, and a third filter layer 4 with an anti-allergenic material. The filter layers 2, 3, 4 can be arranged in principle in any sequence, i.e., also in deviation of the instantly illustrated embodiment. The filter medium 1 is flowed through by air perpendicular to its areal extension. The flow direction can be selected as desired in this context. One of the filter layers 2, 3, 4 can function as a support layer for the respective other layers.

The filter layers 2, 3, 4 each comprise, for example, a fiber material, in particular a laid fabric, a woven fabric, a felt, a nonwoven, a spunbonded fabric material (for example, having a weight per surface area between 40 g/m² and 70 g/m²) or a meltblown material. The filter layers 2, 3, 4 can be formed of a continuous layer of fiber material wherein the layer sequence results only from the fact that a first area (filter layer 2) of the material is provided for particle filtration, a second area (filter layer 3) is furnished with the antimicrobial material, and a third area (filter layer 4) is furnished with the anti-allergenic material. The three areas (filter layers 2, 3, 4) can be arranged one behind the other in the flow direction. Alternatively, several separate filter layers 2, 3, 4 of fiber material can be provided which are in particular adhesively connected to each other. The first layer then comprises the particle filtration function (filter layer 2), the second layer the antimicrobial material (filter layer 3), and the third layer the anti-allergenic material (filter layer 4). The above explanations regarding the areas and layers apply likewise to all of the instant embodiments.

In another embodiment, the two filter layers 2, 3 can form an independent filter medium 1' (without the filter layer 4) that comprises a filter layer 2 for filtration of particles and a filter layer 3 with an anti-allergenic material and an antimicrobial material. For example, between the first and the second filter layers 2, 3 an adsorption filter layer 5 with active carbon can be arranged. The second filter layer 3 can be arranged at the inflow side or outflow side relative to the first filter layer 2.

Alternatively, the filter layer 2 may comprise the particle filter function and contain the anti-allergenic material. The filter layer 3 comprises then the antimicrobial material. In a further variant, the filter layer 2 can comprise the particle filtration function and contain the antimicrobial material. The filter layer 3 comprises the anti-allergenic material in this variant.

In yet another embodiment, the filter medium 1" comprises only the filter layer 2 which contains an anti-allergenic material and an antimicrobial material and moreover comprises the particle filtration function. For example, the filter layer 2 can be provided on both faces with active substances. In particular, the second filter layer 3 of FIG. 1 is a topside material layer with an antimicrobial material and the third filter layer 4 a bottom side material layer with an antimicrobial material.

The afore described particle filtration function can realize, for example, particularly filtration of particles of a diameter of 2.5 μm and smaller, the so-called particulate matter (in accordance with the so-called 1997 PM2.5 standard of the Environmental Protection Agency (EPA)). In particular, filtration efficiency of greater than 90% can be achieved for the aerodynamically determined particle size fraction of 0.3 μm to 2.5 μm, determined according to DIN 71460-1, with test dust A4 according to ISO 12103-1 at a volumetric flow rate of 300 m$^3$/h. Preferably, this filtration efficiency is greater than 92% and in certain applications greater than 97%. Such a fine filter can be provided e.g. also in a further filter layer (not illustrated).

The filter layer 2 is preferably a layer that is provided with active carbon as an adsorber and can also be of a multi-layer configuration.

The filter medium 1, 1', 1" is capable of killing off microorganisms, in particular fungi or fungal spores, and of preventing at the same time growth of bacteria, fungi, and other microorganisms on the filter medium and in particular of preventing effectively a penetrating growth. Penetrating growth is understood as propagation of mycelium-forming microorganisms through a barrier layer, for example, a biocidal layer. This penetrating growth can also happen with bacteria that propagate through this barrier layer. Accordingly, penetrating growth of mycelium-forming microorganisms can also be prevented effectively. The mold spores are retained for example as a result of their size (2 μm-100 μm, typically 2 μm-10 μm) partially by the antimicrobial filter layer 3, or they impact on the filter layer furnished with the antimicrobial active substance and can be inactivated or their growth can be inhibited in this way.

A support material, in particular fiber material, can be furnished for formation of a filter layer with the desired action with different antimicrobial materials, for example, silver, copper, aluminum compounds. A possible antimicrobial material is zinc pyrithione because it has a significant fungi-inhibiting effect and a very low solubility in water. A further material is octylisothiazolinone. In addition, finishes on the basis of nanosilver and chemically acting substances are possible, for example, 2-bromo-2-nitropropan-1,3-diol, isothiazolinone compounds, benzoic acid and benzoic acid derivatives, benzalkonium halides, water-soluble coenzymes and oil-soluble coenzymes, plant extracts, further biocidal metals, aliphatic fatty acids and/or aromatic fatty acids as well as quaternary surfactants, wherein the active substances can be used as a further option as well as in combination with zinc pyrithione.

As anti-allergenic materials—not only in relation to pollen—in particular polyphenols, such as catechines, tannins or flavonoids such as anthocyanidins, flavanones, flavonols, flavols or isoflavones, stilbenes, lignanes, ellagic tannins or phenolic acid are conceivable. They can be effective at the level of allergic sensitization as well as in case of renewed exposure to the allergen: polyphenol can form insoluble complexes with allergenic proteins so that the latter become hypoallergenic. Also, polyphenols can inhibit the T-cell proliferation and cytokine production and affect antibody production via B-cells. In particular, caffeic acid, gallic acid, ellagic acid, tannic acid, cyanidin, procyanidin, proanthocyanidins, rutin, quercetin, resveratrol, olive leaf extracts, gingko leaf extracts as well as tree bark extracts can be employed. Moreover, tannin and/or tannic acid, in particular derived from wood (for example, tree bark), apple extracts or citrus fruit extracts are conceivable as polyphenols. In particular, also synthetically produced polyphenols can be employed as anti-allergenic materials. Combinations of the aforementioned different polyphenols are also possible.

Furnishing of the filter layer or filter layers with the antimicrobial or anti-allergenic materials can be realized by means of different processes, for example, by spray application, slop padding, thermosol processing, or by means of a Foulard machine. The functionalized layer is advantageously applied onto the inflow side and/or the outflow side. Due to the multi-layer sandwich construction it is possible to protect the actual particle filter layer 2 and to ensure in this way high filtration efficiency. Also, the sandwich construction has the advantage that in this way different filter media that are used in vehicle interior filters can be provided with an additional antimicrobial and/or anti-allergenic layer which can be offered as an additional option for the existing filters (in case of vehicle interior filters, a plurality of different filter media are employed that are tailored to regional as well as manufacturer-specific requirements). Also, by means of the additional antimicrobial and/or anti-allergenic layer, adapted solutions for different fields of application are achievable. For example, for different climatic conditions also different microorganisms play a role in regard to growth on filter media so that the anti-microbial materials applied to the second filter layer can be selected accordingly and, in addition, the weight per surface area can be varied. Also, the type of possible allergens, such as pollen, can be taken into consideration when functionalizing with anti-allergenic materials such as polyphenols.

In addition or as an alternative, the layer (meltblown) that determines the filtration efficiency can be furnished by a masterbatch with antimicrobial and/or anti-allergenic materials or the medium can exhibit an increased efficiency by additional introduction of antimicrobial fibers or anti-allergenic fibers of particles produced by a masterbatch.

The subsequent application of the respective active substance has the advantage relative to the direct addition during fiber manufacture (masterbatch) that reduced active substance concentrations are sufficient because the active substance is located on the exterior of the fiber and thus is in direct contact with the microorganisms. An advantage of the masterbatch production or of addition of fibers from a masterbatch process resides in that the antimicrobial materials are anchored particularly strongly on the fibers.

The filter layer 2 can be designed in particular as an adsorption filter layer. The layer itself can be comprised of a multi-layer construction of layers, stacked on each other, of fixed fills of active carbon particles on support layers or can be formed of an open pore foam with poured-in active carbon particles. It is possible to have several double layers of fixed fills stacked on each other that each, for example, comprise a support layer of spunbonded nonwoven of meltblown PET fibers (polyethylene terephthalate) with a weight per surface area of e.g. 85 g/m$^2$ and an air permeability of e.g. 5,500 l/m$^2$s at 200 Pa. Onto this, by means of an adhesive based on polyurethane and applied in thin strings, a fill of active carbon spheres of e.g. 400 g/m$^2$ is applied. The fill preferably has, at a relative humidity of the air of 50%, a water absorption capacity of, for example, 9 percent by mass and a BET surface area of, for example, 900 m$^2$/g. The active carbon particles have in general diameters in the range of 0.2 mm to 0.7 mm.

In a variant, the adsorption filter layer is formed of active carbon particles and comprises an open pore (reticulated) foam of polyurethane with a pore density of, on average, 40 ppi (pores per inch) or 1.6 pores per mm into which the active carbon particles have been poured and fixed within the foam by means of a two-component adhesive on the basis of polyurethane. Both variants of absorption layers have an extension of 30 mm in the flow-through direction.

FIG. 2A shows a further embodiment of a filter medium 1. Two filter layers 5, 5' with an adsorber material are provided between which a filter layer 2 is arranged. The filter layers 5, 5' are arranged, in turn, between filter layers 3, 4. The filter layer 3 can be functionalized to be antimicrobial and preferably to be additionally anti-allergenic. Moreover, the filter layer 3 can be arranged at the outflow side. The filter layer 4 can be anti-allergenically functionalized and preferably additionally antimicrobially functionalized. Moreover, the filter layer 4 can be arranged at the inflow side.

The filter layer 2 is, for example, designed as a fine filter layer. The fine filter layer 2 is, for example, an unfolded, i.e., flat, or zigzag-folded filter medium of a fiber layer with synthetic fibers, for example. In this context, a fiber nonwoven can be employed also, for example. It comprises preferably a cover layer of a spunbonded nonwoven that is lined on one side or two sides. In this way, in particular a mechanical protection of the usually sensitive fine filter layer is achieved. This is in particular advantageous when the filter medium 1 and thus also the fine filter layer are folded because, in this way, the medium is protected in particular from damage due to folding. Moreover, such cover layers can contribute to improving the mechanical strength of the fine filter layer 2.

The spunbonded nonwovens of the cover layer(s) are in this context in particular formed of a material in the form of polyester or polypropylene or polyamide. For example, the spunbonded nonwovens of the cover layer(s) have weights per surface area in the range of 10 g/m$^2$ to 250 g/m$^2$, preferably 15 g/m$^2$ to 60 g/m$^2$, and particularly preferred 15 g/m$^2$ to 40 g/m$^2$. Preferred layer thicknesses for the cover layers are in the range of 0.1 mm to 0.3 mm.

The spunbonded nonwoven of the cover layers can be formed of endless fibers that are stretched by means of heated air and/or galettes and laid randomly onto a transport belt. Subsequently, optionally a calendering process for generating a fiber composite and/or for influencing the nonwoven surfaces can be carried out. The respective cover layer is connected in particular by means of a calendering process with the glass fiber paper.

FIG. 2B shows a filter medium 1 with a filter layer 4 which is functioning as a support layer. The filter layer 4 is for example configured as a filter nonwoven and is furnished with an anti-allergenic material. Moreover, the filter medium 1 comprises a filter layer 2 which is configured as a filter nonwoven for particle separation and provided with an antimicrobial, in particular biocidal, finish. Between the filter layers 2, 4, a multi-layer adsorption construction 5 is provided. The latter comprises three adhesive layers 6 (these can be also support or cover layers) with two respectively interposed active carbon layers 7. In regard to the properties of the active carbon layers, the aforesaid applies.

The filter medium 1 of FIG. 2C differs from that of FIG. 2B in that the filter layer 2 is formed as a particulate matter filter nonwoven that comprises an antimicrobial material and is designed to filter particulate matter with a particle diameter of 2.5 μm and smaller from the air (so-called PM2.5 nonwoven that has a filtration efficiency of greater than 90%, preferably greater than 92%, for the aerodynamically determined particle size fraction of 0.3 to 2.5 μm, determined according to DIN 71460-1, with test dust A4 according to ISO 12103-1 at a volumetric flow rate of 300 m$^3$/h). A gauze 10 can be arranged between the filter layer 2 and the adsorption construction 5.

FIG. 3 shows an embodiment of a filter element 8 that comprises a flat filter medium 1. The filter medium 1 is of a three-layer configuration and comprises a particle retention layer 2 that is positioned between an antimicrobial filter layer 3 and an anti-allergenic filter layer 4. The particle retention layer 2 serves as a support layer for the two other filter layers 3, 4. The filter medium 1 is folded in a zigzag shape so that the filter surface area is increased. Such a folded filter medium is also called a fold pack. Laterally, an optional side strip 11 is illustrated which is applied onto the fold profiles and stabilizes them. Possibly present bulk material, such as adsorber particles, between the layers 2, 3, 4 is secured between the layers by the side strip 11, that is e.g. glued on, and is thus prevented from flowing out.

In proper use, the raw air to be purified passes through the fold pack or filter element 8. In doing so, in particular dust particles and liquid particles are retained. The antibacterial and/or antimicrobial materials in the filter medium 1 enable a particularly hygienic operation. Also, persons suffering from allergies are protected from allergens. Purified clean air exits from the filter element 8 and can be guided, for example, into the passenger compartment of a motor vehicle or to a further air-conditioning process.

FIG. 4 shows an embodiment of a filter arrangement 12 that is designed as a filter module of a motor vehicle air-conditioning device. A filter receptacle or a filter housing 13 contains a filter element 8, as indicated in the preceding embodiments, for example. Raw air flows through an inlet 15 into the housing 13 and exits in purified form as clean air from an outlet 16. The filter element 8 separates the raw air area 17 from a clean air area 18 and is sealed laterally relative to the housing 13.

The proposed filter medium can be used not only in motor vehicle passenger compartment filters. Further fields of application are vacuum cleaner filters, filter elements for building air-conditioning systems and stationary air-conditioning devices, filter elements for air purifiers, respiration filters, and the like. Also, further filter layers can be provided that exhibit special retention properties.

While specific embodiments of the invention have been shown and described in detail to illustrate the inventive principles, it will be understood that the invention may be embodied otherwise without departing from such principles.

What is claimed is:

1. A filter medium comprising:
   a first filter layer configured to retain particles;
   a second filter layer comprising an antimicrobial material and further comprising an anti-allergenic material; and
   an adsorption layer comprising active carbon as an adsorber;
   wherein the adsorption layer is arranged immediately between the first filter layer and the second filter layer;
   wherein the active carbon is hydrophobic active carbon in which, at a relative humidity of the air of 50%, has a water absorption capacity of <10 percent by mass.

2. The filter medium according to claim 1, wherein the anti-allergenic material comprises polyphenols.

3. The filter medium according to claim 2, wherein the polyphenols are tannin, tannic acid, apple extracts, or citrus fruit extracts.

4. The filter medium according to claim 3, wherein the tannin or the tannic acid is obtained from wood.

5. The filter medium according to claim 3, wherein the tannin or the tannic acid is obtained from tree bark.

6. The filter medium according to claim 1, wherein the anti-allergenic material comprises enzymes.

7. The filter medium according to claim 1, wherein the antimicrobial material is selected from the group consisting of antimicrobial metals, antimicrobial metal compounds, zinc pyrithione, octylisothiazolinone, 2-bromo-2-nitropropan-1,3-diol, isothiazolinone compounds, benzoic acid, benzoic acid derivatives, benzalkonium halides, water-soluble coenzymes, oil-soluble coenzymes, plant extracts, antibiotics, biocidal metals, aliphatic fatty acids, aromatic fatty acids, and quaternary surfactants.

8. The filter medium according to claim 7, wherein the antimicrobial metals are selected from the group consisting of silver, nanosilver, and copper.

9. The filter medium according to claim 7, wherein the antimicrobial compounds are aluminum compounds.

10. The filter medium according to claim 1, wherein the antimicrobial material is applied by spray application, by slop padding or by using a Foulard machine.

11. The filter medium according to claim 1, wherein the anti-allergenic material is applied by spray application, by slop padding or by using a Foulard machine.

12. The filter medium according to claim 1, wherein the adsorption layer comprises an open pore foam and the active carbon is pourable active carbon poured into the open foam.

13. The filter medium according to claim 1, wherein the active carbon is a fixed fill of active carbon.

14. The filter medium according to claim 1, wherein the adsorption layer comprises adhesive layers and the active carbon is pourable active carbon interposed between the adhesive layers.

15. The filter medium according to claim 1, wherein
   at least one of the first filter layer and of the second filter layer is configured as a fine filter configured to filter particulate matter and comprises a filtration efficiency of greater than 90% for the aerodynamically determined particle size fraction of 0.3 to 2.5 µm, determined according to DIN 71460-1, with test dust A4 according to ISO 12103-1 at a volumetric flow rate of 300 m$^3$/h.

16. The filter medium according to claim 15, wherein the filtration efficiency is greater than 92%.

17. The filter medium according to claim 16, wherein the filtration efficiency is greater than 97%.

18. The filter medium according to claim 1, wherein the second filter layer is arranged at an outflow side or at an inflow side relative to the first filter layer.

19. A motor vehicle passenger compartment filter comprising
   a filter medium according to claim 1.

20. A filter arrangement comprising
   a filter receptacle and
   a motor vehicle passenger compartment filter,
   wherein the motor vehicle passenger compartment filter comprises a filter medium according to claim 1.

21. The filter arrangement according to claim 20, wherein the filter arrangement is a filter module of a motor vehicle air-conditioning device.

22. The filter medium according to claim 1, wherein the anti-allergenic materials comprise apple extracts, or citrus fruit extracts.

23. The filter medium according to claim 1, wherein the active carbon comprises ion exchanger spheres made from polymer selected from the group consisting of: synthetic resins, or polystyrene cross-linked with divinyl benzene.

* * * * *